L. C. MARSHALL.
PISTON PACKING.
APPLICATION FILED DEC. 12, 1919.

1,413,923.

Patented Apr. 25, 1922.

Inventor:
Lewis C. Marshall,
by Roberts Roberts & Cushman
his Attorneys.

UNITED STATES PATENT OFFICE.

LEWIS C. MARSHALL, OF WALPOLE, MASSACHUSETTS, ASSIGNOR TO PRESSURE PROOF PISTON RING COMPANY, OF BOSTON, MASSACHUSETTS, A CORPORATION OF MASSACHUSETTS.

PISTON PACKING.

1,413,923.  Specification of Letters Patent.  Patented Apr. 25, 1922.

Application filed December 12, 1919. Serial No. 344,432.

*To all whom it may concern:*

Be it known that I, LEWIS C. MARSHALL, a citizen of the United States of America, and resident of Walpole, in the county of Norfolk and State of Massachusetts, have invented new and useful Improvements in Piston Packings, of which the following is a specification.

This invention relates to piston rings or packing for use with engines utilizing fluid or liquid pressure against a piston. While broadly applicable to any such engine, it is particularly adapted for use with internal combustion engines.

Internal combustion engines operate under a high cylinder temperature, and the cylinder is externally cooled while the piston is not. This necessitates a comparatively large clearance between piston and cylinder when the engine is cool in order that there may be no binding when the engine is warmed up. Packing of a character to withstand high temperatures and to take up a considerable variation in piston clearance is therefore essential.

The common type of packing used in such engines consists of spring rings broken at one point and sprung into grooves in the piston. The rings are normally of greater diameter than the interior of the cylinder and are intended to keep in close contact with the cylinder walls through their inherent resiliency. These rings when they expand do not, however, maintain the form of a true circle and there is consequent loss of compression and unequal wear or scoring of the cylinder.

It is an object of the present invention to provide a piston packing composed of a plurality of interfitted rings all adapted to fit into the grooves of usual form in pistons now in use.

It is also an object to provide such a multiple ring which is simple and economical to manufacture and which can be readily assembled on the piston and easily removed therefrom.

It is another object to provide a piston packing which will maintain intimate and uniform contact with the cylinder walls and also with both sides of the groove in the piston and which will not reciprocate in the groove.

It is a further object to provide a multiple ring comprising a plurality of bearing rings so interfitted that the several bearing rings will be uniformly pressed against the cylinder wall.

Other and further objects will appear as the disclosure proceeds.

I have illustrated two preferred embodiments of my invention in the accompanying drawings, in which—

Figure 1:
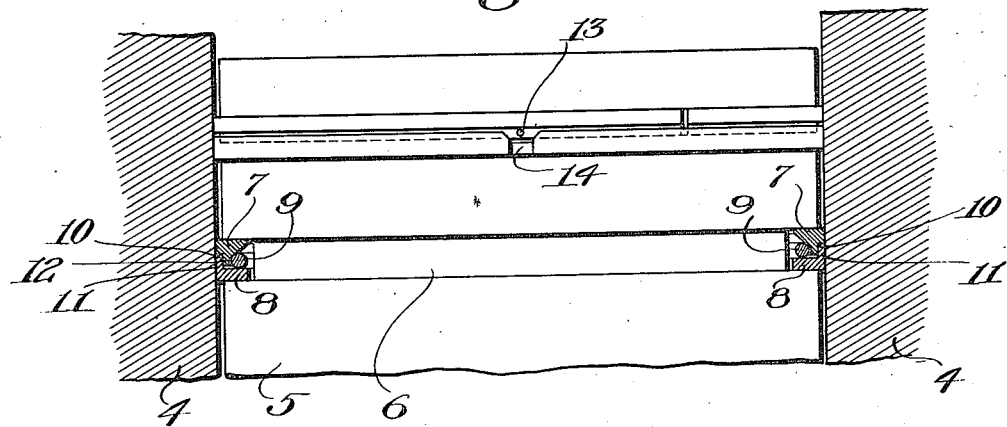
Figure 1 is a view partly in elevation and partly in cross-section showing a piston fitted with my improved packing.

In the drawings 4 indicates the cylinder walls and 5 the cylinder having the grooves 6 therein. As shown best in Fig. 2, my packing is composed of bearing rings 7 and 8 and the spring follower ring 9. The first bearing ring 7 is formed with a circumferential recess 10 adjacent the cylinder wall and the second bearing ring has its bearing face extended to form a circumferentially extending ridge 11 fitting the recess of the first ring. The spring follower ring which is shown as circular in cross-section is carried on the flat interiorly extending portion 15 of the second bearing ring. The upper portion of the follower ring bears against a beveled surface 16 of the first bearing ring. This beveled surface is preferably inclined at an angle approximately 40° to the flat face of the second bearing ring. The beveled surface may be so placed as to form the circumferential ridge 12 as shown in Figs. 1 and 2, or it may be placed so as to eliminate this ridge as shown in Fig. 3, the first bearing ring being here designated by 7'.

Both bearing rings are formed of resilient material split at a single point, as indicated at Fig. 1, in which the upper packing is shown whole and the lower packing half broken away. The splits of the two rings are preferably separated by approximately 35° of their circumference. A pin 13 may be placed upon the ring 7 to fit in the split 14 of the ring 8 and maintain the relative positions of the two splits.

Figure 2:
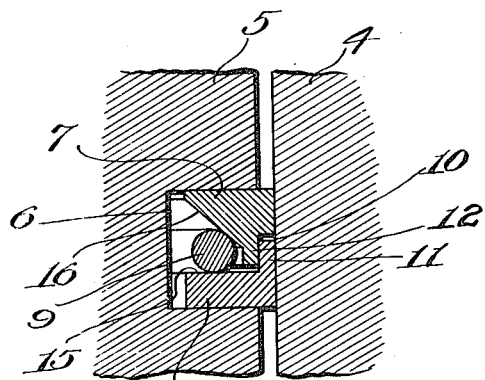
Figure 2 is an enlarged cross-section of the form of packing shown in Fig. 1.
Figure 3:
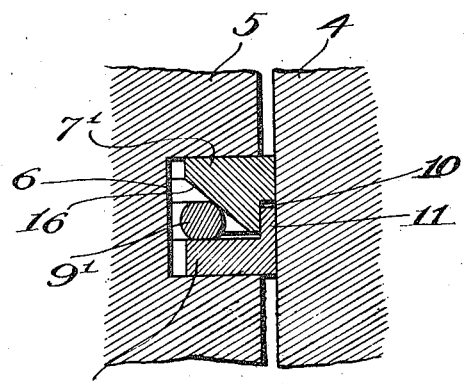
Figure 3 is a cross-section of a modified form of packing.

The spring follower ring may be made with a circular cross-section as shown in Figs. 1 and 2, or with one or both of its horizontal surfaces flattened as shown at 9', Fig. 3. The latter form is sometimes preferable in that it gives a broader bearing surface on ring 8 and consequently there is less likelihood of the ring wearing a groove and tending to remain seated therein. If flattened on both sides the ring is reversible.

The two bearing rings are so interfitted that the first bearing ring (7 or 7') is expanded by the radial component of the thrust from the spring follower ring and the recess and interfitting ridge of the second bearing ring are so proportioned that the second bearing ring (8) is carried out by the first and both rings contact with the cyclinder. A small amount of clearance is allowed between the two bearing rings when fitted in the groove, the amount depending somewhat on the working tolerances of manufacture. A slight clearance is desirable to facilitate assembly.

The axial component of the thrust of the spring follower ring on the first bearing ring urges that ring into intimate contact with the adjacent side of the groove and the bearing of the follower ring against the flat portion of the second bearing ring similarly forces that ring into contact with its adjacent side of the groove.

In my composite packing, therefore, the bearing rings are urged into intimate and uniform contact both with the cylinder walls and the sides of the groove.

There is a tendency for any ring to reciprocate axially in the groove due to the very rapid movement of the piston and its sudden stop and reversal of movement. It is therefore essential that in a composite packing the relation between the bearing members and follower members shall be such as to prevent this reciprocation, which is highly objectionable. The reciprocation causes wear of parts, loss of pressure and also has a tendency to pump lubricating oil into the cylinders with its consequent undesirable carbon deposit.

I have found the proportions and angles as shown and described to be adapted for use with the average motor at present in use, but it is to be understood that motors of widely differing speed of piston travel and length of piston stroke will require different angles and proportions. I have found, however, that it is not desirable to have both bearing rings with beveled inner surfaces as in such packing the inertia of the bearing rings tends to squeeze the follower ring inwardly from between them at the ends of the stroke, and there is consequently reciprocation of the packing.

Another important feature of my invention lies in the fact that the radial outward thrust due to the spring follower ring is applied at substantially the middle of the axial depth of the packing, which point of thrust tends to equalize the pressure of contact throughout the depth of the packing.

I claim:

1. A piston packing comprising a pair of bearing rings and a spring follower ring fitted therebetween, a beveled surface on one bearing ring being adjacent to a flat surface on the second bearing ring, the spring follower ring resting upon the flat surface and bearing upon the beveled surface whereby the two bearing rings are forced axially against the sides of the groove and the first bearing ring is forced radially outward and means whereby outward movement of said latter ring constrains the second ring likewise to expand.

2. A piston packing comprising a pair of bearing rings and a spring follower ring fitted therebetween, a beveled surface on one bearing ring being adjacent to a flat surface on the second bearing ring, the spring follower ring resting upon the flat surface and bearing upon the beveled surface whereby the two bearing rings are forced axially against the sides of the groove and the first bearing ring is forced radially outward, and a portion of the second bearing ring cooperating with a portion of the first bearing ring whereby the second bearing ring is forced radially outward by the first bearing ring.

3. A piston packing comprising a pair of bearing rings and a spring follower ring fitted therebetween, a beveled surface on one bearing ring being adjacent to a flat surface on the second bearing ring, the spring follower ring resting upon the flat surface and bearing upon the beveled surface whereby the two bearing rings are forced axially against the sides of the groove and the first bearing ring is forced radially outward, and a circumferential ridge portion of the second bearing ring cooperating with a circumferentially recessed portion of the first bearing ring whereby the second bearing ring is forced radially outward by the first bearing ring.

4. A piston packing comprising a pair of bearing rings and a spring follower ring, the first bearing ring having a circumferential recess in its outer surface adjacent to the second ring and having a beveled inner surface against which the spring follower ring bears, and the second bearing ring having a circumferential ridge adapted to fit in the circumferential recess of the first bearing ring, the spring follower ring bearing against the beveled surface of the first bearing ring to cause a radial and an axial thrust, the radial thrust being transmitted to the second bearing ring by the cooperating circumferential recess and ridge.

5. A piston packing comprising a pair of bearing rings and a spring follower ring, the first bearing ring having a circumferential recess in its outer surface adjacent to the second ring and having a beveled inner surface against which the spring follower ring bears, and the second bearing ring having a circumferential ridge adapted to fit in the circumferential recess of the first bearing ring and having a flat inner surface, the spring follower ring bearing against the beveled surface of the first bearing ring to cause a radial and an axial thrust, and against the flat surface of the second bearing ring to cause an opposite axial thrust, the radial thrust being transmitted from the first bearing ring to the second bearing ring by means of the cooperating circumferential recess and ridge.

6. A piston packing comprising a pair of bearing rings, a spring follower ring located between the bearing rings and urging the first of said bearing rings radially outward and a portion of said first bearing ring cooperating with a portion of said second bearing ring whereby said second bearing ring is urged radially outward.

7. A piston packing comprising a pair of bearing rings, a spring follower ring located between the bearing rings and urging the first of said bearing rings radially outward and a circumferentially recessed portion of said first bearing ring cooperating with a circumferential ridge portion of said second bearing ring whereby said second bearing ring is urged radially outward.

Signed by me at Boston, Massachusetts, 10th day of December, 1919.

LEWIS C. MARSHALL.